United States Patent
Vhora et al.

(10) Patent No.: US 7,062,370 B2
(45) Date of Patent: Jun. 13, 2006

(54) MODEL-BASED DETECTION, DIAGNOSIS OF TURBINE ENGINE FAULTS

(75) Inventors: Mohamad Hanify Vhora, Tempe, AZ (US); Sachi K. Dash, Scottsdale, AZ (US); Sujit V. Gaikwad, Glendale, AZ (US); Dale Mukavetz, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 16 days.

(21) Appl. No.: 10/815,036

(22) Filed: Mar. 30, 2004

(65) Prior Publication Data

US 2005/0222747 A1    Oct. 6, 2005

(51) Int. Cl.
  *G06F 19/00* (2006.01)
(52) U.S. Cl. .......................... 701/100; 701/29
(58) Field of Classification Search ............ None
  See application file for complete search history.

(56) References Cited

U.S. PATENT DOCUMENTS

| | | | | |
|---|---|---|---|---|
| 5,018,069 A | * | 5/1991 | Pettigrew | 701/35 |
| 6,014,598 A | * | 1/2000 | Duyar et al. | 701/29 |
| 6,016,465 A | * | 1/2000 | Kelly | 702/116 |
| 6,466,858 B1 | * | 10/2002 | Adibhatla et al. | 701/100 |
| 6,574,537 B1 | * | 6/2003 | Kipersztok et al. | 701/29 |
| 6,625,569 B1 | * | 9/2003 | James et al. | 702/183 |

OTHER PUBLICATIONS

Diversi et al.; Residual design for dynamic processes using decoupling technique; IEEE; Decision and Control, 2003; vol. 1, pp. 451-456; Dec. 19, 2003.*

Marcos et al.; Robust identification and residual generation application to a turbofan engine; IEEE: Aerospace Conference, 2004; vol. 5, pp. 3384-3395; Mar. 6, 2004.*

* cited by examiner

*Primary Examiner*—Michael J. Zanelli
(74) *Attorney, Agent, or Firm*—Kris T. Fredrick

(57) ABSTRACT

A method of monitoring turbine engines used in aircraft from sensor signals from an engine for a predetermined set of engine characteristics. The signals are transmitted to a nonlinear engine model that predicts the output values for the given set of engine characteristics. The model generates residuals by calculating the difference between the actual values and the predicted values for each member of the set. The generated residuals are evaluated to estimate bounds of uncertainties as indicative of sensor noise. Incoming residuals from ongoing actual engine values are continuously tested against the bounds. A fault is signaled for each of the set of characteristics when a detected bound is exceeded. A computer is used to calculate the fault residual for each of the set of characteristics and the closest fault residual is selected as a diagnosed fault.

18 Claims, 7 Drawing Sheets

MODEL-BASED DETECTION, DIAGNOSIS OF TURBINE ENGINE FAULTS

FIELD OF THE INVENTION

The present invention relates in general to the analysis of operational data on aircraft engines and, more particularly, to a model-based technique for using a nonlinear engine model in conjunction with operational data from the engine to detect existing engine performance related faults as well as predict impending faults.

BACKGROUND OF THE INVENTION

The operation of gas turbine engines will, in time, lead to a decrease in efficiency due to wear and damage as well as other factors. Because the rate of deterioration depends on a varied of operational factors, the actual rate for an individual engine is very difficult to predict. Accordingly, engine components are scheduled for maintenance based on a predetermined number of hours or cycles of operation. This maintenance program selects the time for either inspection or overhaul or both based upon factors such as past experiences. If a component actually fails before the expected time, tests are made to revise the routine for this part.

Efforts have been made to estimate the reliability remaining in an engine of this type, and sensors are employed to provide data on which to monitor and determine engine operational conditions and expected life before repair. While this is appropriate for statistically large numbers, because individual components vary because of manufacturer's tolerances, deterioration due to time or wear, and the effect of one failing or weakened part on other parts, no theoretical estimate other than one of extreme conservative limits of use would be accurate for all the engines of any given type.

Prior art efforts to resolve this dilemma have not been successful. U.S. Pat. Nos. 6,466,858 and 6,532,412 and their Patent Application Publication No. US 2002/0193933 to Adibhatla et al all relate to a technique of calculating reference parameters (e.g. component efficiency) of the engine at any given time and trending them for monitoring their health. In the Adibhatla et al patents and publication, a parameter estimate algorithm (Kalman filter, or regression) is suggested to be used for trending, which is said to be useful in fault diagnosis and isolation. Even though, this approach works in theory, it could be very difficult estimation problem.

U.S. Pat. No. 5,018,069 to Pattigrew uses simple empirical correlations and has to correct the data to standard operating conditions, then compare the data with nominal data. Due to the absence of a rigorous model, in addition to the sensor information, it uses various calculated parameters such as egt vs. fuel flow for fault diagnosis.

U.S. Pat. No. 5,951,611 to La Pierre is similar to Pattigrew and is based on online data trends. It discloses a data driven technique. It also uses different trend parameters where shifts are identified. These shifts are not mapped with the real life faults. With the exception of performance loss, the fault descriptions are not precise.

U.S. Pat. No. 6,408,259 to Goebel et al. describes a data based anomaly detection method, which uses a fuzzy KNN (k nearest neighbor) algorithm on preprocessed sensor data and transformed data to classify operation data as normal or abnormal data. Goeble et al. does not address fault diagnosis and is not model based.

U.S. Pat. No. 6,591,182 to Cece et al. provides a manual for decision-making process for diagnostic trend analysis using an aircraft engine as an example. Cece et al. uses an approach that is data driven and uses various thresholds (similar to fuzzy logic) to diagnose the faults.

U.S. Patent Application Publication No. US2003/0167111 to Oscar Kipersztok et al. is related to different architectures of fault detection in which observed system symptoms are used to short-list the suspected components and then use reliability and other empirical data to assign fault probabilities to these suspect components.

None of the prior art considers the possibility of with calculating the residuals and matching them with individual fault models. Accordingly, it would be of great advantage if a system could be developed that uses a fault model based on prior experience, physics, and data analysis.

Another advantage would be to provide a system that uses pattern-matching techniques for fault diagnosis and isolation.

Yet another advantage would be to have a system that uses residual calculation and fault model matching.

A great advantage would be to have a system for detecting simultaneous occurrence of multiple faults.

Finally, an important advantage would be to have a system that is are able to diagnose the realistic faults such as turbine erosion, lube oil clogging and the like.

Other advantages and features will appear hereinafter.

SUMMARY OF THE INVENTION

The present invention provides a model-based technique for using a nonlinear engine model in conjunction with operational data from the engine to detect existing engine performance related faults as well as predict impending faults. Sensor signals from the operating engine are sent to a nonlinear engine model that generates residuals of the sensor signals. Residuals are the difference between actual and model predicted values.

The residuals are statistically analyzed to estimate bounds of uncertainties as indicative of sensor noise. Then the incoming residuals are compared from engine data against bounds, such that a fault is detected when a threshold is exceeded. Detection of a fault activates a computer to calculate fault residuals for each fault model, using a model matching technique. At this point, the fault model which brings the residuals back to normal bounds is the diagnosed fault.

The present invention provides significant advantages and makes an important advance in the field of engine health monitoring. The accurate fault model is based on the physics of the process, again being validated using real engine data. The quantitative approach of fault detection and determining fault intensity is consistent with statistical process control theory. The invention captures both steady state and dynamic operating data. The present invention does not require any information beyond the sensor reading in its operational phase. In this invention, an "engine" means either of aircraft propulsion or auxiliary power unit (APU) and both are turbine engines.

BRIEF DESCRIPTION OF THE DRAWINGS

For a more complete understanding of the invention, reference is hereby made to the drawings, in which.

In the figures, like reference characters designate identical or corresponding components and units throughout the several views.

DETAILED DESCRIPTION OF THE PREFERRED EMBODIMENT

Figure 1:
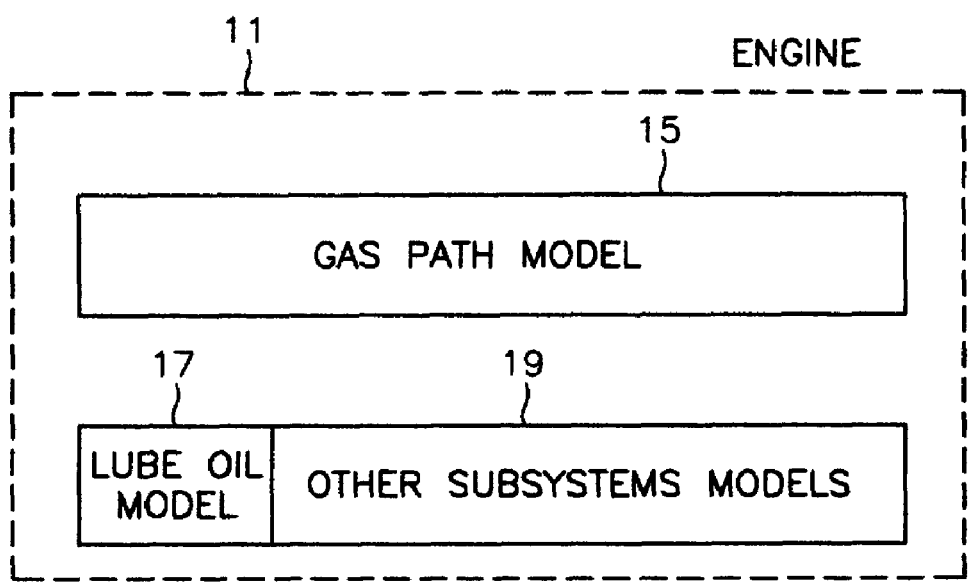
FIG. 1 is a block diagram showing an overview of the engine with the gas path model, the lube oil model and provisions for other subsystem models.

Referring to FIG. 1, an engine such as a gas turbine engine used in aircraft is shown schematically by dash-line 11. A model is constructed having a gas path model 15, a lube oil model 17 and any other subsystem models 19 that may be selected for the monitoring of the engine.

Figure 2:
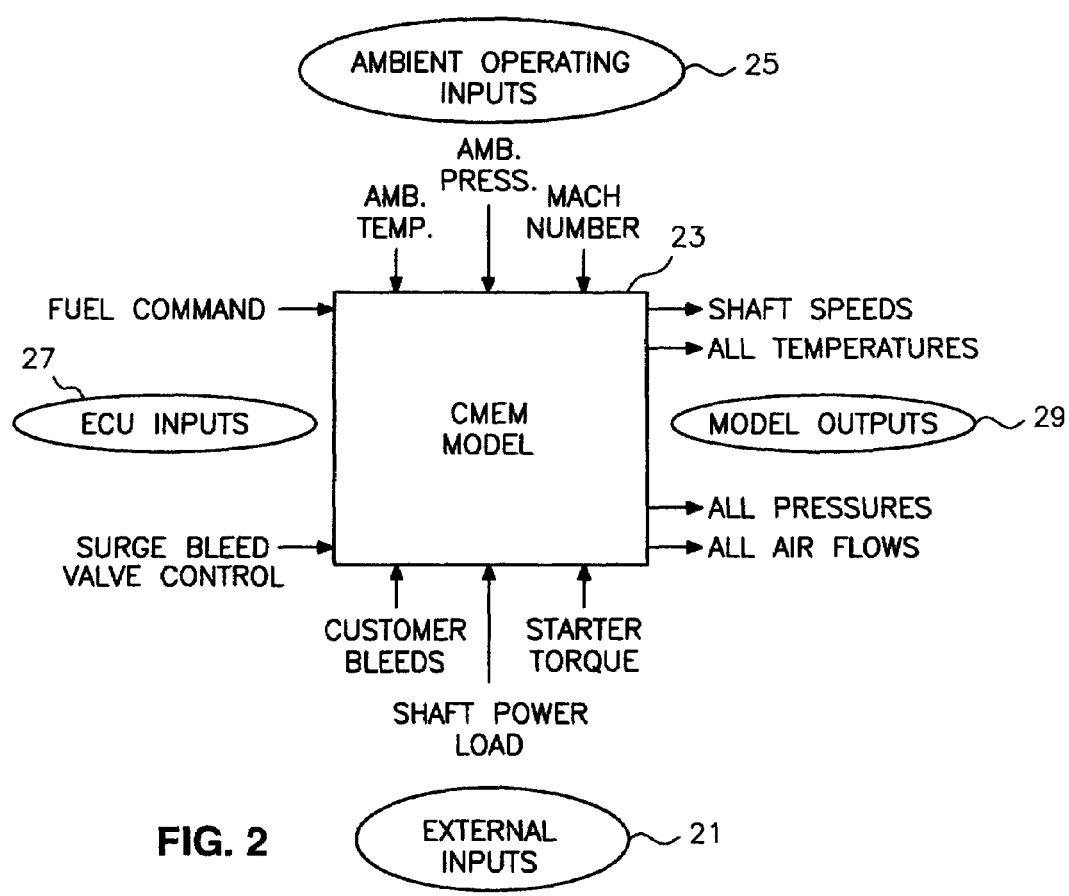
FIG. 2 is a block diagram of the input-output structure of the gas path model of FIG. 1.

The gas path model 15 is shown in FIG. 2 in detail, where external inputs 21, including customer bleeds, shaft power load, and starter torque are sent from sensors (in external inputs 21) to a CMEM model 23, which is a Component Map-based Engine Model and it is a nonlinear model. The incoming engine data is stored and processed. Ambient operating inputs 25 including, for example, temperature, pressure, Mach number and speed. Engine control unit inputs 27 are input into CMEM 23, including fuel commands and surge bleed valve control elements. Residuals are calculated by comparing the actual data inputs (on a continuous or steady state basis) with model predicted values that model CMEM 23 has determined for a set of data that represents the operating conditions of the engine being monitored. Model outputs 29 are computed for all the operating conditions, including shaft speeds, all temperatures, all pressures and all air flows.

Figure 3:
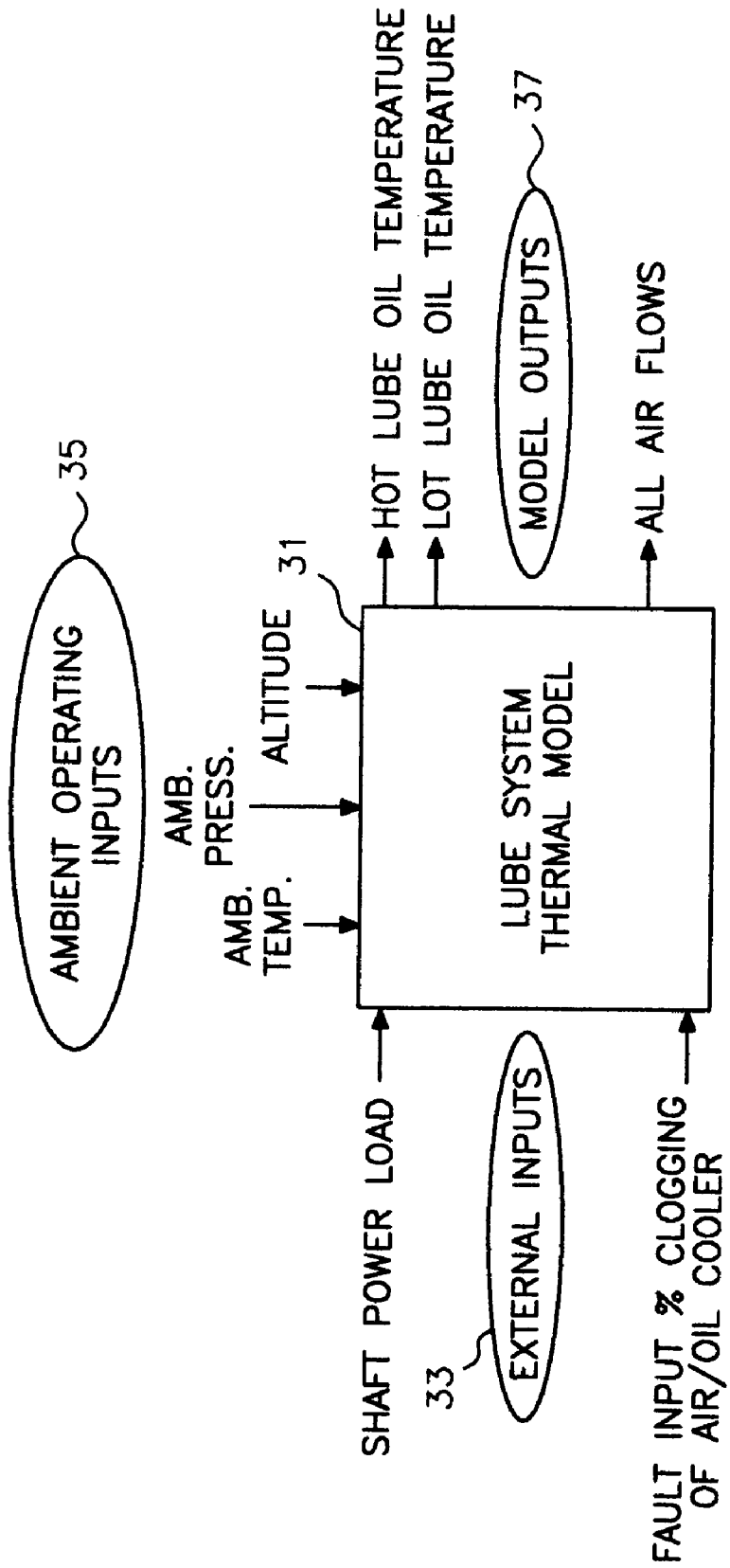
FIG. 3 is a block diagram of the input-output structure of the lube oil model of FIG. 1.

Similarly, the Lube System Thermal Model 31 shown in FIG. 3 receives data in from External Inputs 33, including shaft power load and fault input defined as percent clogging of the air and oil cooler. Ambient Operating Inputs 35 include temperature, pressure and altitude, which the Lube System Thermal Model 31 processes to provide Model Outputs 37 to give Lube Oil Temperatures and all air flows.

Figure 4:
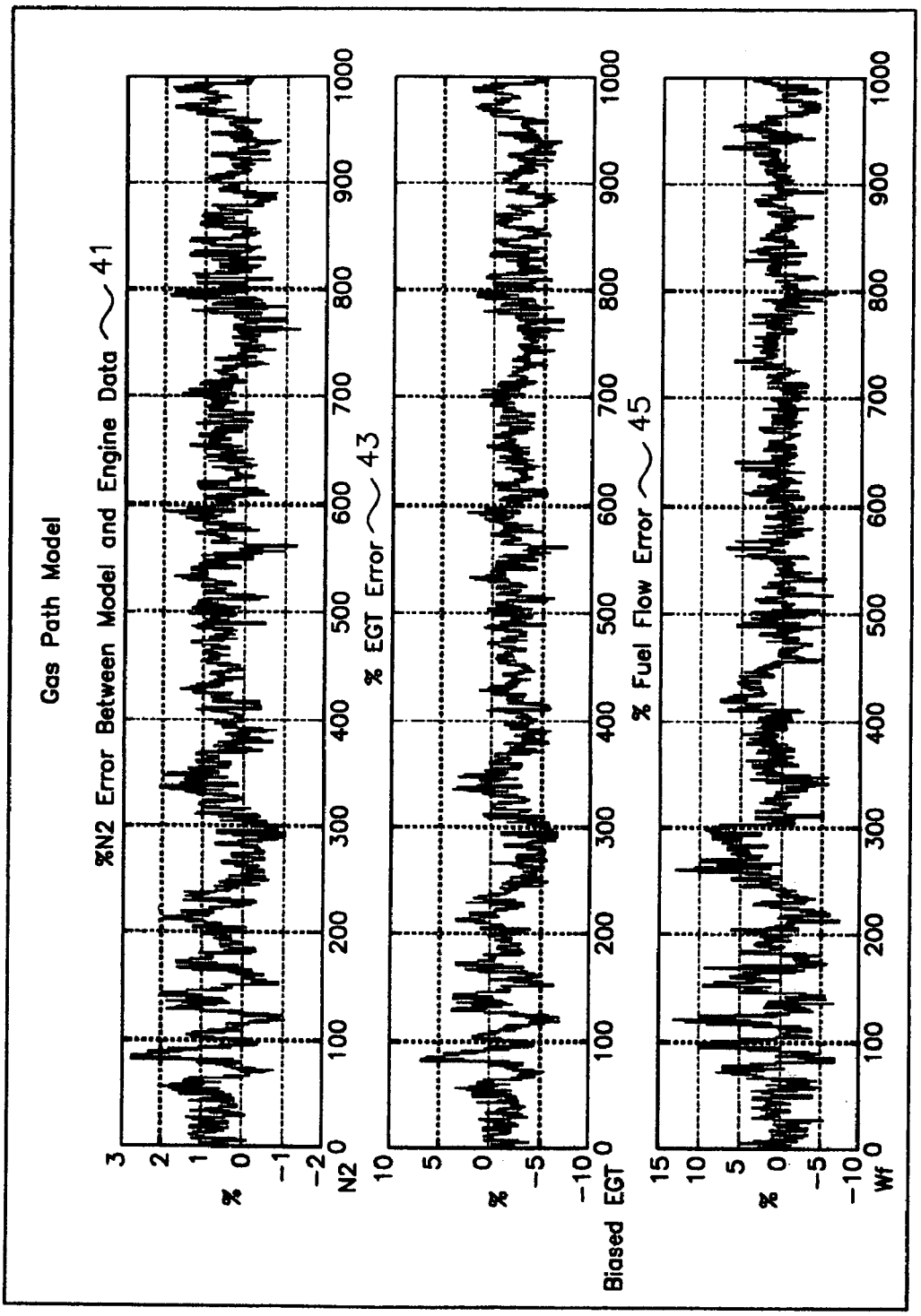
FIG. 4 is a graphical comparison of percent error between model and actual engine data for the gas path model of FIG. 1.
Figure 5:
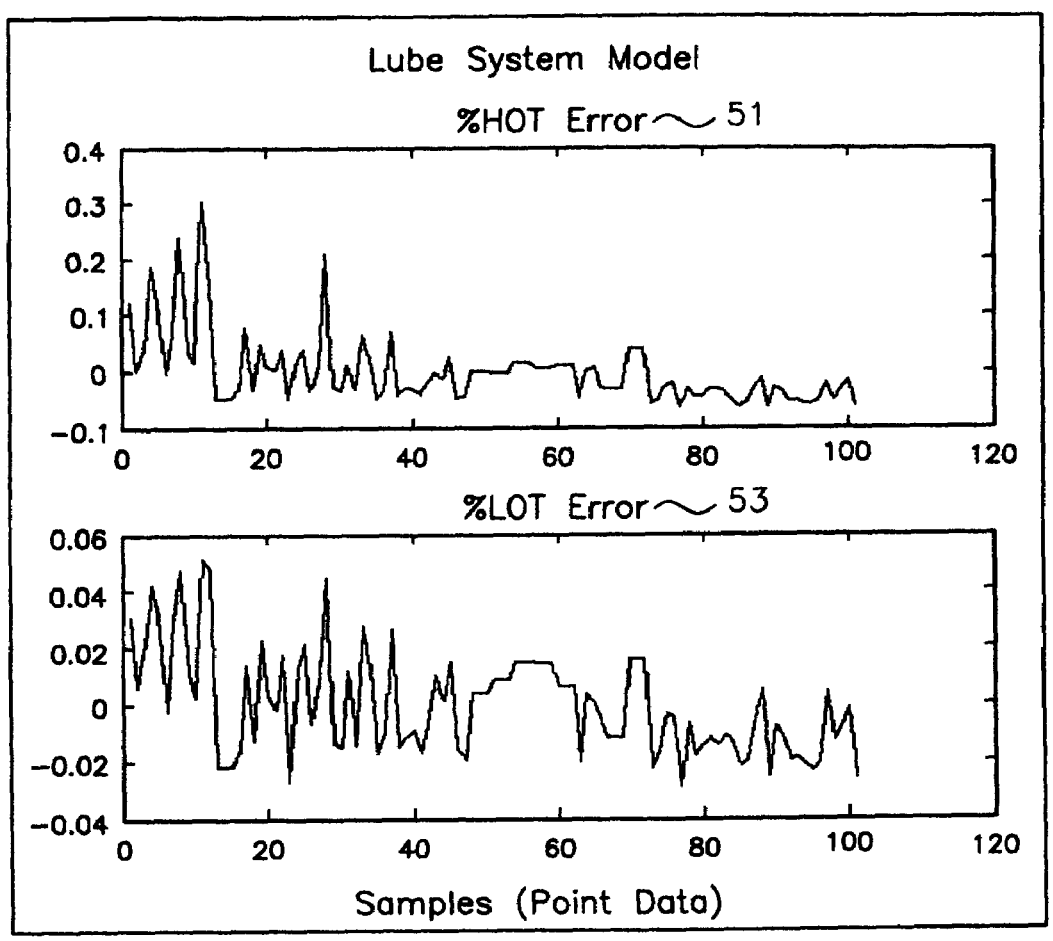
FIG. 5 is a graphical comparison of percent error between model and actual engine data for the lube oil model of FIG. 1.

A number of engines were evaluated in the field with the present invention and relevant sensor readings have been compared. EGT (exhaust gas temperature), N2 (engine speed), LOT (low oil temperature), HOT (high oil temperature) and fuel flow are compared and the percent error is calculated. Percent error is defined as the Model data value minus the sensor data value times 100 and divided by the sensor data value. [(model−sensor)*100]/sensor. Shown in FIG. 4 is a comparison with field engine data, showing the % N2 error between model and engine data at 41, % EGT error at 43, and % fuel flow error at 45. FIG. 5 shows the Lube System Model data with % HOT error at 51 and % LOT error at 53.

Various engine component faults are modeled by modifying one or more component characteristics in the model. For example, the high pressure compressor deteriorates in performance due to erosion of its rotor blades. This erosion occurs faster if an engine operates in areas with high air borne dust particles. This degradation manifests in lost performance in terms of reduction in efficiency, air flow and pressure rise at given conditions. This type of degradation or fault is modeled by reducing the efficiency of the compressor in the model, along with reducing its air flow and pressure rise characteristics. Thus the fault models represent the actual physics of the fault, based on fundamental knowledge of the components. These models are also validated by matching them with test data from actually degraded engines. All these parameters are varied in fixed proportion, such that each fault manifests itself by unique variation in output parameters, compared to normal or healthy models. Typical faults that have been modeled are HP turbine deterioration, bleed band fault, HP compressor deterioration, fan rotor deterioration, LP compressor deterioration and air/oil cooler clogging in the lube oil system.

Table 1 below shows the typical fault signatures for unit change in fault parameters. They represent the relative change at steady state for given step change in fault parameter. For example, if fault parameter is increased from 0 to 1% in HP turbine fault model, the over all N2 speed will be reduced by 0.6% from its nominal speed, fuel flow will be increased by 0.6%, etc. The fault model works in both steady state as well as dynamic conditions, and the numbers in the table are for illustration purposes. Usually very small fault conditions are not detectable due to operating noise and variations. However fault levels that warrant attention (e.g., 2% degradation of turbine) are easy enough to detect using the method of this invention.

TABLE I

Typical Fault Signatures (1% change)

| HP Turbine | Bleed Band | Lube System |
|---|---|---|
| N2 −0.6% | N2 +0.3% | HOT +0.6% |
| Fuel Flow +0.6% | Fuel Flow +0.7% | LOT +0.5% |
| EGT + 12° F. | EGT + 9° F. | |
| P3 − 0.5% | P3 − 0.3% | |

Figure 6:
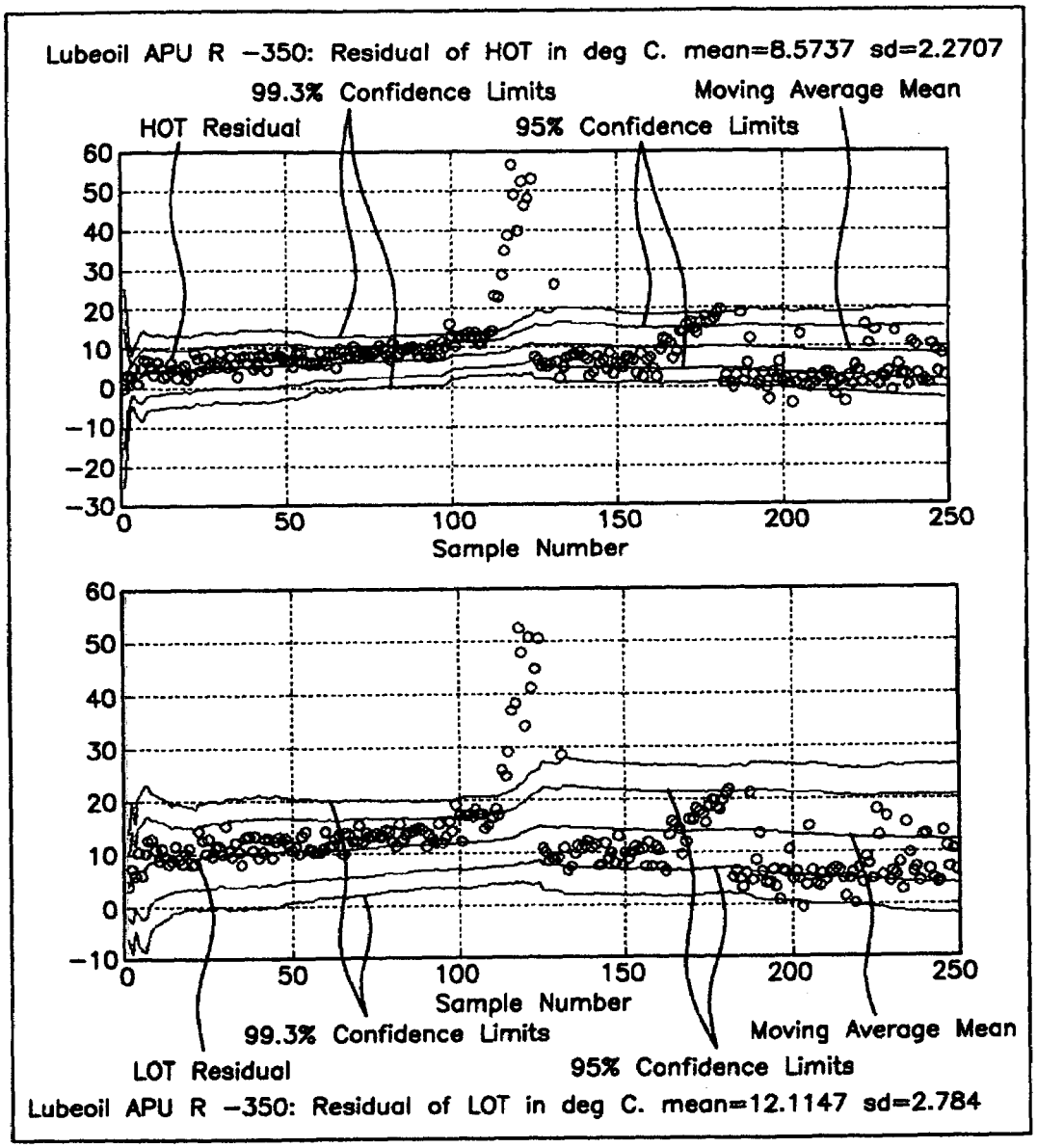
FIG. 6 is a graphical representation of anomaly detection.

Anomalies are detected using analysis of residuals. When residual errors exceed statistical control limits calculated from normal operations, there is a probability that the system is behaving abnormally. For example, FIG. 6 shows anomaly detection for the lube oil system using HOT and LOT residuals. An anomaly is detected when the residuals exceed desired confidence bounds. In this case it is observed that the possibility of abnormal system behavior exists between sample numbers 100 and 150 for both HOT and LOT residuals. After sample number 150 the lube system was repaired and the residuals returned to normal levels within the control limits. The dashed line shows the 99.3% confidence (5-sigma) bound and the dotted line shows the 95.5% confidence bound. Using the higher degree of confidence 99.3% bound reduced false positives in anomaly detection. In this case we can be fairly certain (>99.3%) that there was an abnormal event when values of both HOT and LOT residuals are consistently higher than the 99.3% bound between sample numbers 100 and 150.

A systematic method is used to detect faults using fault models. A fault is validated using one or more signatures after an anomaly is detected. For diagnosis, the dataset is analyzed at a specific time for a fault. The approach is similar to pattern matching. Using the fault model, a search on the fault intensity parameter is made such that the error residuals return within their respective control limits.

Figure 7:
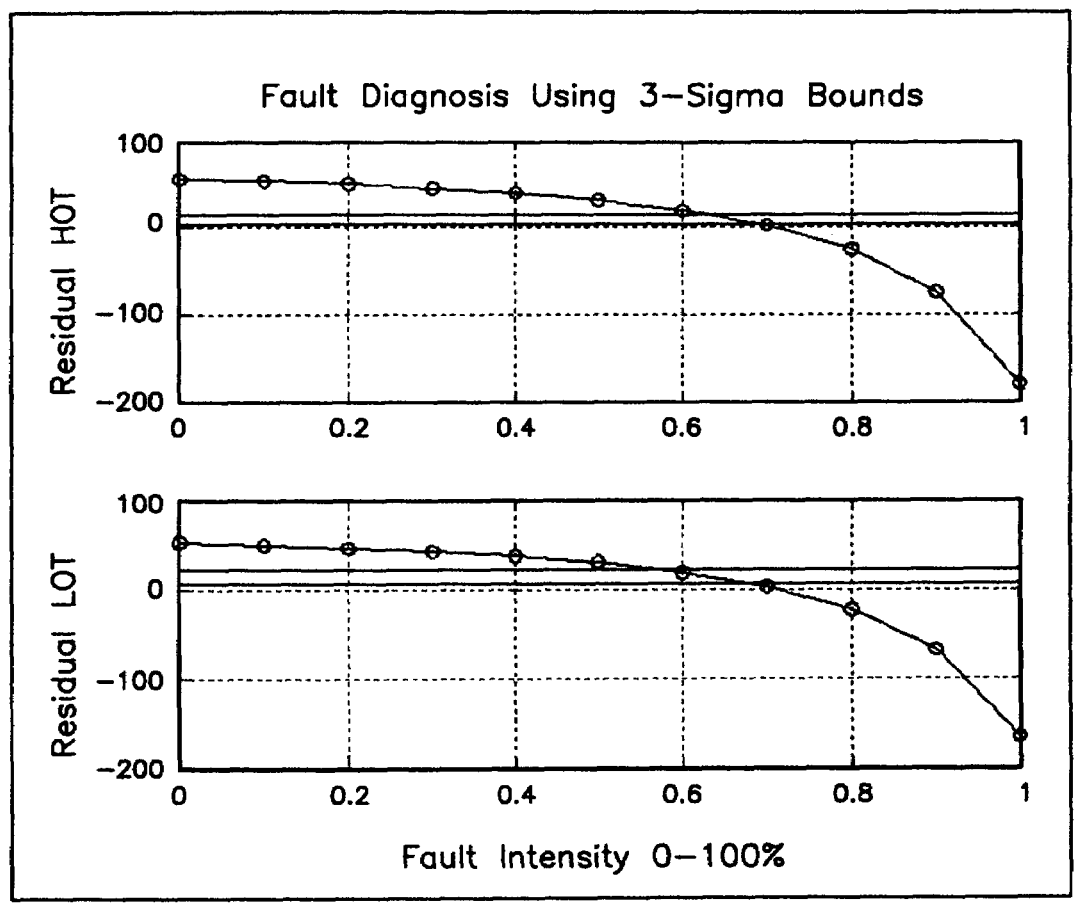
FIG. 7 is a graphical representation of the fault diagnosis in accordance with the present invention.

For the lube system an anomaly is detected in the HOT and LOT temperatures between sample number 100 and 150. Based on the fault signature in FIG. 1, a lube oil fault is possible because both HOT and LOT residuals are outside the control limits. FIG. 7 graphically shows the fault diagnosis method applied to the lube system. The graph is constructed by using the fault model for the lube system. The fault intensity parameter in the model is varied from 0 to 100% and residuals are calculated based on a point when the anomaly was detected. It is observed from the figure that both HOT and LOT residuals return to their 95.5% (3-sigma) confidence interval when the fault intensity is between 60% to 70%. In other words, there exists a range of fault intensity parameters between 60% and 70% when both HOT and LOT residuals are within their 3-sigma bounds. This indicates the possibility of a fault in the lube system. All calculations are done automatically. FIG. 7 is a graphical representation of the computation.

While particular embodiments of the present invention have been illustrated and described, they are merely exemplary and a person skilled in the art may make variations and modifications to the embodiments described herein without departing from the spirit and scope of the present invention. All such equivalent variations and modifications are intended to be included within the scope of this invention, and it is not intended to limit the invention, except as defined by the following claims.

The invention claimed is:

1. A method of monitoring turbine engines, comprising the steps of:
obtaining sensor signals from an engine for a predetermined set of engine characteristics;
transmitting said signals to a nonlinear engine model having predicted values for said predetermined set of engine characteristics and generating residuals by calculating the difference between the obtained sensor signals and the predicted values for each member of said set;
statistically analyzing the generated residuals of each set to estimate bounds of uncertainties as indicative of sensor noise;
comparing incoming residuals from ongoing actual engine values against said bounds and signaling a fault for each of said set of characteristics when a detected bound is exceeded;
calculating a fault residual for each of said set of characteristics and selecting the fault residual closest to said bounds of uncertainties as a diagnosed fault.

2. The method of claim 1, wherein said model divides said predetermined sets of characteristics into static modules and dynamic modules.

3. The method of claim 2, wherein said static modules represents major rotating components by maps.

4. The method of claim 3, wherein said static modules calculate power, enthalpy and temperatures for each component.

5. The method of claim 2, wherein said dynamic modules determine inter-component pressures by flow balance.

6. The method of claim 5, wherein said dynamic modules calculate spool speeds from a power balance.

7. A system for monitoring turbine engines, comprising:
sensors for obtaining sensor signals from an engine for a predetermined set of engine characteristics;
a nonlinear engine model adapted to receive said sensor signals, said model having predicted values for said predetermined set of engine characteristics and adapted to generate residuals by calculating the difference between the obtained sensor signals and the predicted values for each member of said set;
said model further being adapted to statistically analyze the generated residuals of each set to estimate bounds of uncertainties as indicative of sensor noise;
said model including a comparator for comparing incoming residuals from ongoing actual engine values against said bounds and signaling a fault for each of said set of characteristics when a detected bound is exceeded; and
said model including a calculator for calculating a fault residual for each of said set of characteristics and selecting the fault residual closest to said bounds of uncertainties as a diagnosed fault.

8. The system of claim 7, wherein said model divides said predetermined sets of characteristics into static modules and dynamic modules.

9. The system of claim 8, wherein said static modules represents major rotating components by maps.

10. The system of claim 9, wherein said static modules calculate power, enthalpy and temperatures for each component.

11. The system of claim 8, wherein said dynamic modules determine inter-component pressures by flow balance.

12. The system of claim 11, wherein said dynamic modules calculate spool speeds from a power balance.

13. A system for monitoring turbine engines, comprising:
sensor means for obtaining sensor signals from an engine for a predetermined set of engine characteristics;
a nonlinear engine model means for receiving said sensor signals, said model having predicted values for said predetermined set of engine characteristics and adapted to generate residuals by calculating the difference between the obtained sensor signals and the predicted values for each member of said set;
said model means further being adapted to statistically analyze the generated residuals of each set to estimate bounds of uncertainties as indicative of sensor noise;
said model means including a comparator for comparing incoming residuals from ongoing actual engine values against said bounds and signaling a fault for each of said set of characteristics when a detected bound is exceeded; and
said model means also including a calculator means for calculating a fault residual for each of said set of characteristics and selecting the fault residual closest to said bounds of uncertainties as a diagnosed fault.

14. The system of claim 13, wherein said model means divides said predetermined sets of characteristics into static modules and dynamic modules.

15. The system of claim 14, wherein said static modules represents major rotating components by maps.

16. The system of claim 15, wherein said static modules calculate power, enthalpy and temperatures for each component.

17. The system of claim 14, wherein said dynamic modules determine inter-component pressures by flow balance.

18. The system of claim 17, wherein said dynamic modules calculate spool speeds from a power balance.

* * * * *